United States Patent
Stephens

(10) Patent No.: US 10,486,509 B2
(45) Date of Patent: Nov. 26, 2019

(54) VEHICLE ATTACHABLE SHIELDING DEVICE

(71) Applicant: Angela Stephens, Chicago, IL (US)

(72) Inventor: Angela Stephens, Chicago, IL (US)

( * ) Notice: Subject to any disclaimer, the term of this patent is extended or adjusted under 35 U.S.C. 154(b) by 157 days.

(21) Appl. No.: 15/690,380

(22) Filed: Aug. 30, 2017

(65) Prior Publication Data

US 2019/0061488 A1    Feb. 28, 2019

(51) Int. Cl.
*B60J 5/04* (2006.01)
*B60N 2/75* (2018.01)

(52) U.S. Cl.
CPC ............ *B60J 5/0413* (2013.01); *B60N 2/783* (2018.02); *B60Y 2410/114* (2013.01)

(58) Field of Classification Search
CPC ... B60J 5/0413; B60N 2/783; B60Y 2410/114
USPC .................... 296/153, 154, 1.08, 1.09, 37.13
See application file for complete search history.

(56) References Cited

U.S. PATENT DOCUMENTS

| | | | |
|---|---|---|---|
| 2,520,584 A | 8/1950 | Underwood | |
| 2,633,186 A | 3/1953 | Jeckell | |
| 2,703,602 A | 3/1955 | Greenstadt | |
| 2,721,605 A | 10/1955 | Griffiths et al. | |
| D243,304 S | 2/1977 | Fuqua | |
| 6,116,675 A * | 9/2000 | Iwasawa | B60N 3/12 224/309 |
| 7,616,977 B1 * | 11/2009 | Nortman | B60R 11/02 174/66 |
| 7,641,252 B2 * | 1/2010 | Sturt | B60N 3/002 296/24.34 |
| 9,346,382 B1 | 5/2016 | Owens | |
| 2005/0274452 A1 * | 12/2005 | Schoemann | B29C 45/1676 156/245 |
| 2008/0100103 A1 * | 5/2008 | Kim | B60R 11/0264 297/188.19 |
| 2016/0114707 A1 | 4/2016 | Nascimento et al. | |

FOREIGN PATENT DOCUMENTS

WO      WO0149519      7/2001

\* cited by examiner

*Primary Examiner* — Jason S Morrow
*Assistant Examiner* — E Turner Hicks

(57) ABSTRACT

A vehicle attachable shielding device for protecting a vehicle control assembly from moisture damage includes a shell that defines an interior space. A first penetration is positioned in a bottom of the shell and defines a rim. The first penetration is configured to insert a control assembly of the vehicle into the interior space. A coupler is coupled to the rim and is configured to couple to an interior surface of a vehicle. A second penetration is positioned in a top of the shell. A panel, which is coupled to the shell, is positioned to selectively couple to the shell to close the second penetration. The shell and the panel are configured to protect the control assembly from moisture damage. The panel is positioned to selectively decouple from the shell so that the second penetration is configured to insert a hand of a user to manipulate the control assembly.

16 Claims, 11 Drawing Sheets

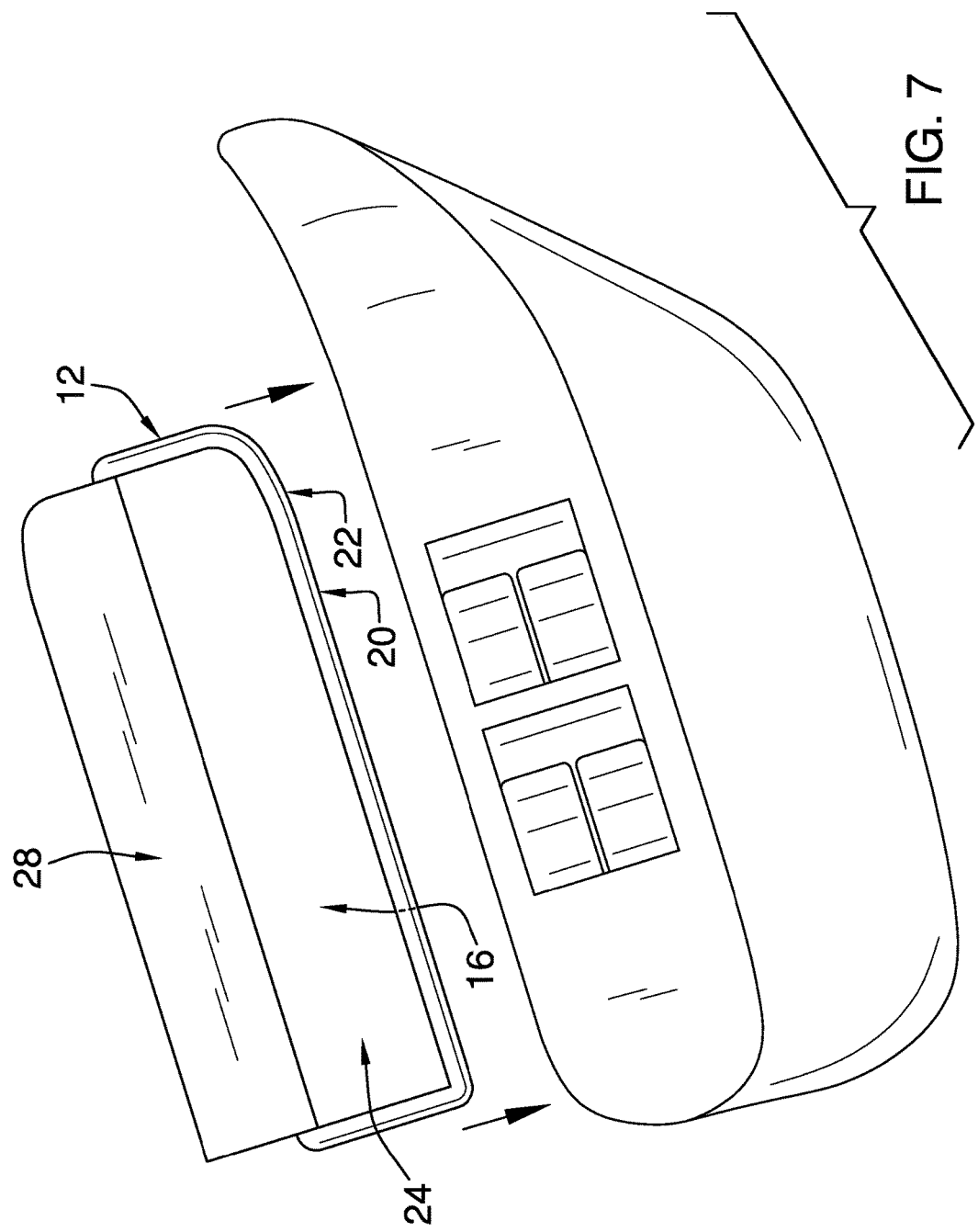

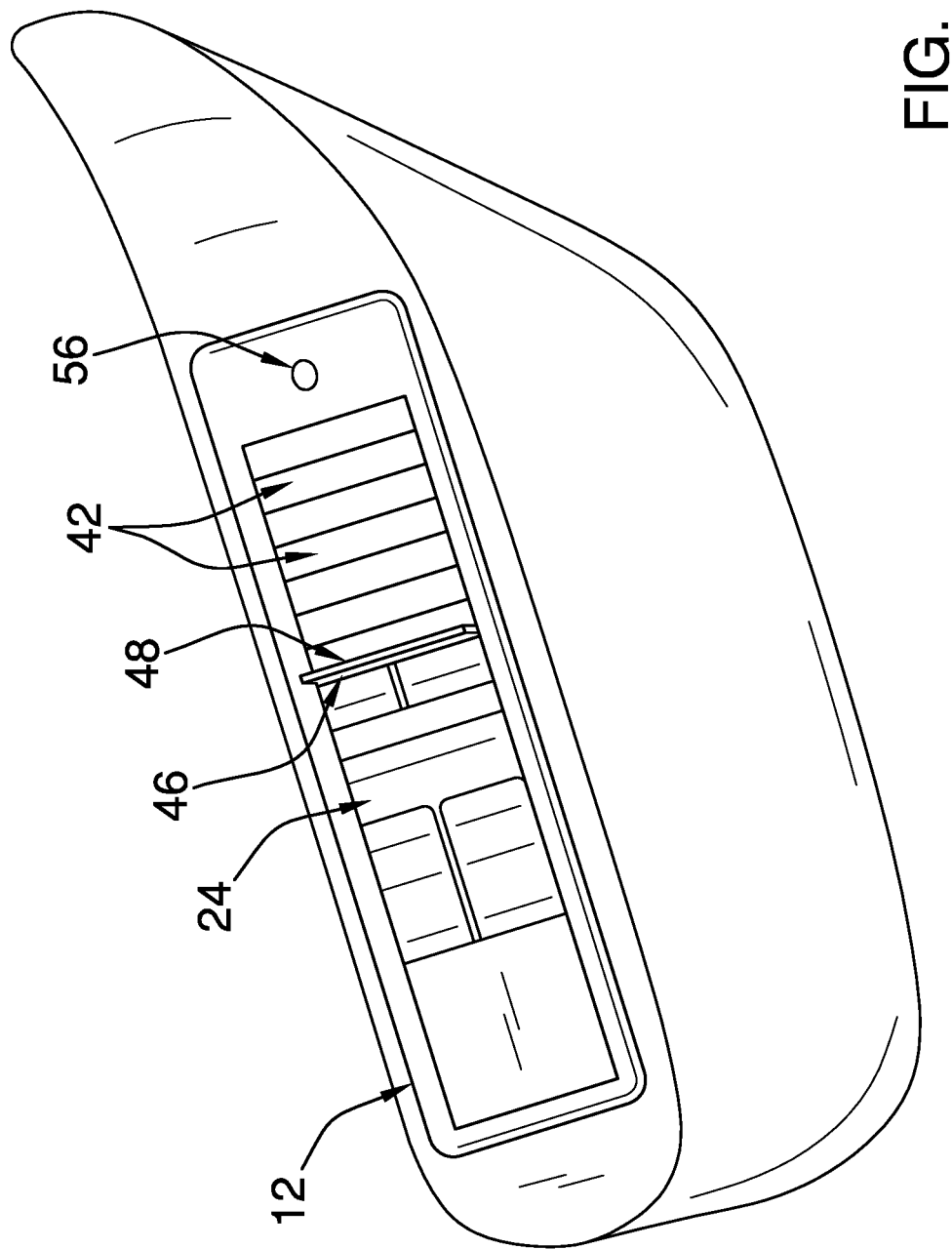

VEHICLE ATTACHABLE SHIELDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to shielding devices and more particularly pertains to a new shielding device for protecting a vehicle control assembly from moisture damage.

BRIEF SUMMARY OF THE INVENTION

An embodiment of the disclosure meets the needs presented above by generally comprising a shell that defines an interior space. A first penetration is positioned in a bottom of the shell and defines a rim. The first penetration is configured to insert a control assembly of the vehicle into the interior space. A coupler is coupled to the rim and is configured to couple to an interior surface of a vehicle. A second penetration is positioned in a top of the shell. A panel, which is coupled to the shell, is positioned to selectively couple to the shell to close the second penetration. The shell and the panel are configured to protect the control assembly from moisture damage. The panel is positioned to selectively decouple from the shell so that the second penetration is configured to insert a hand of a user to manipulate the control assembly.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
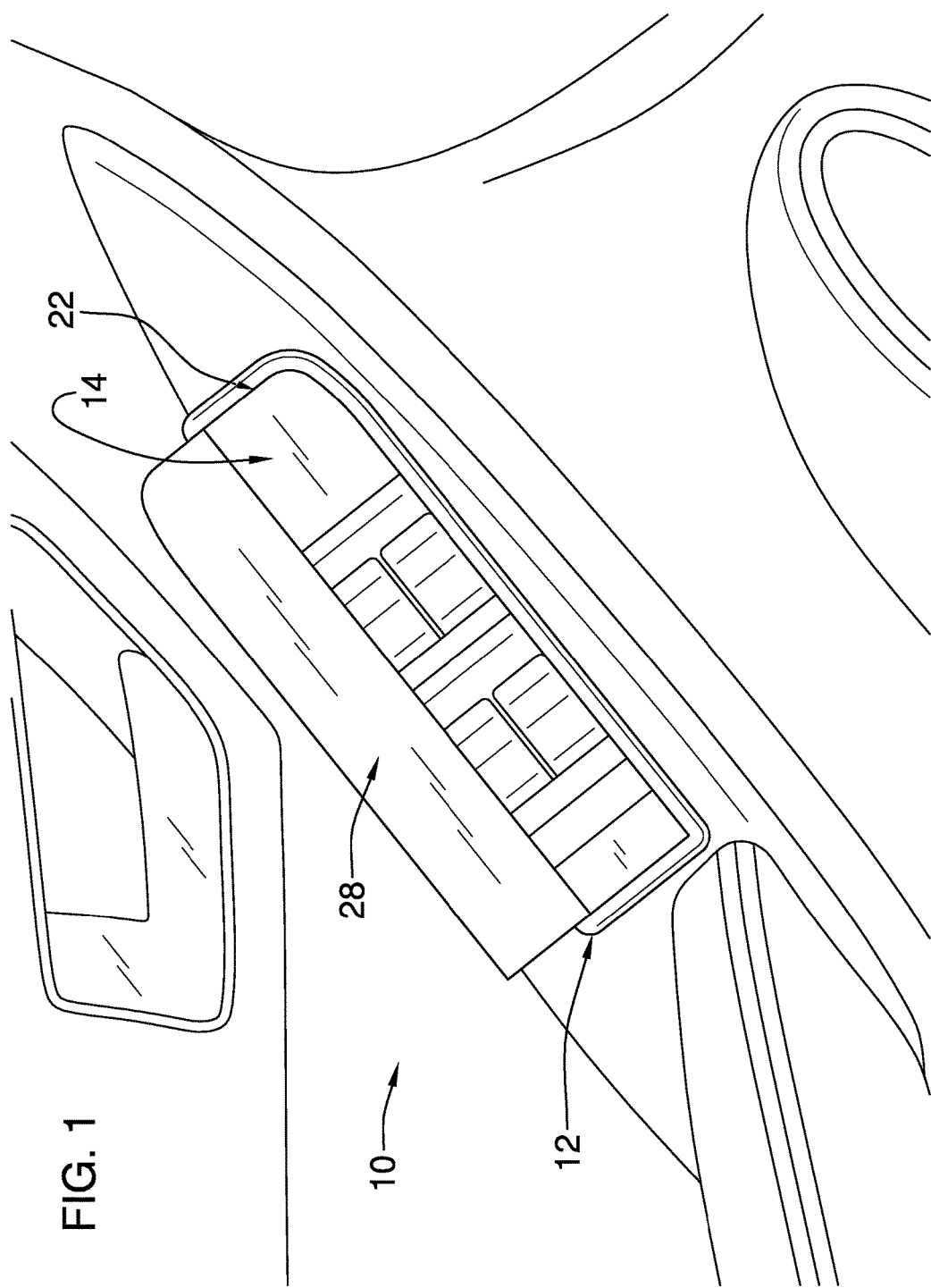
FIG. 1 is an isometric perspective view of a vehicle attachable shielding device according to an embodiment of the disclosure.
Figure 2:
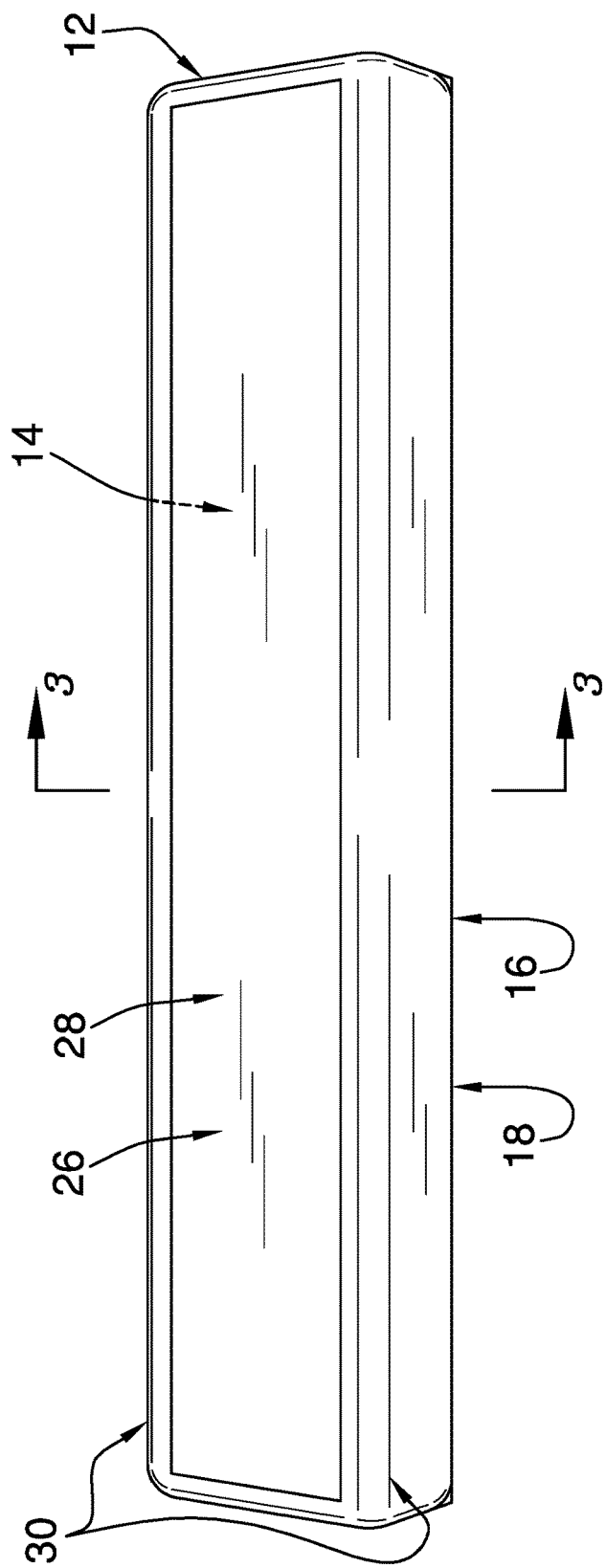
FIG. 2 is an isometric perspective view of an embodiment of the disclosure.
Figure 3:
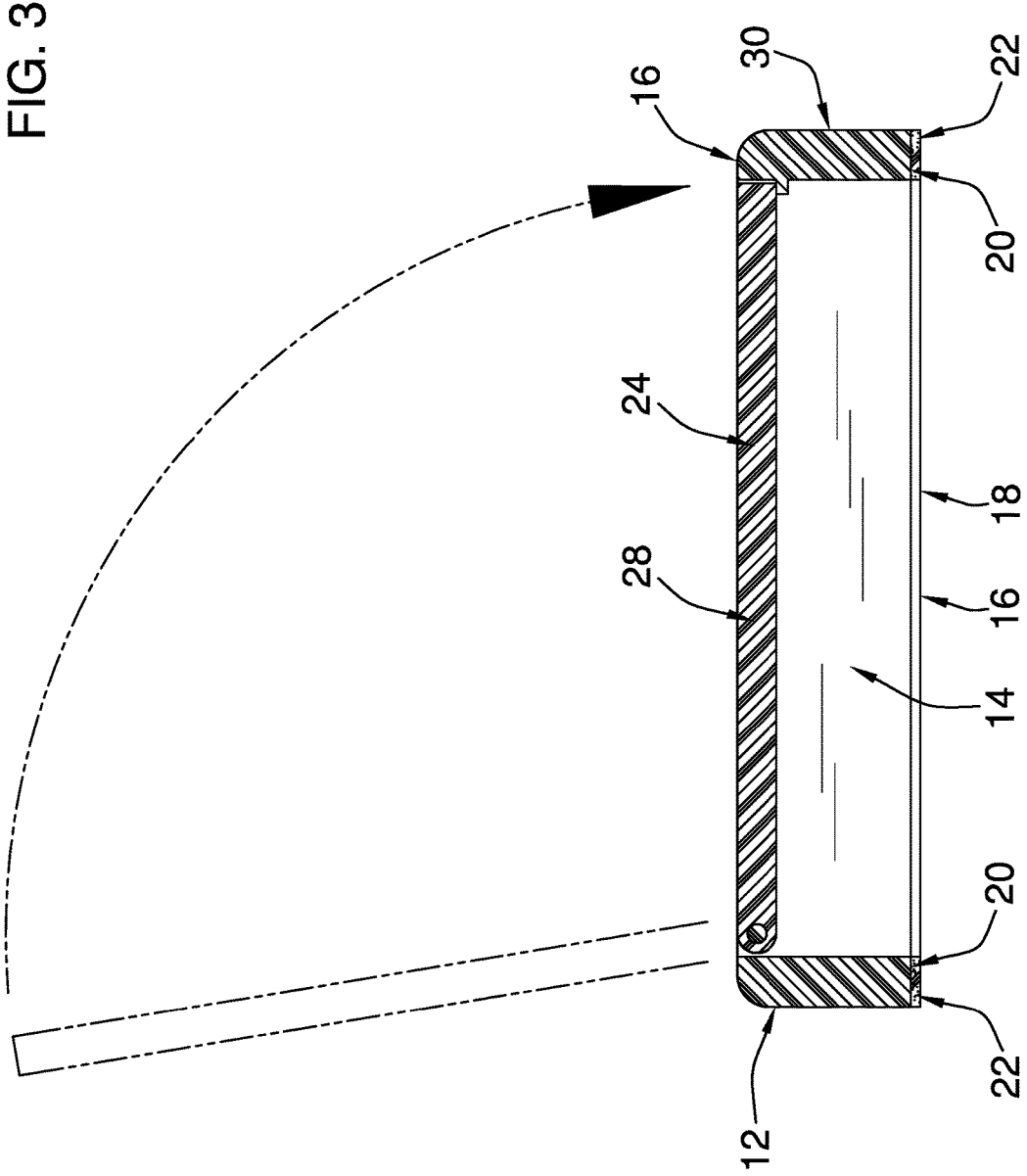
FIG. 3 is a cross-sectional view of an embodiment of the disclosure.
Figure 4:
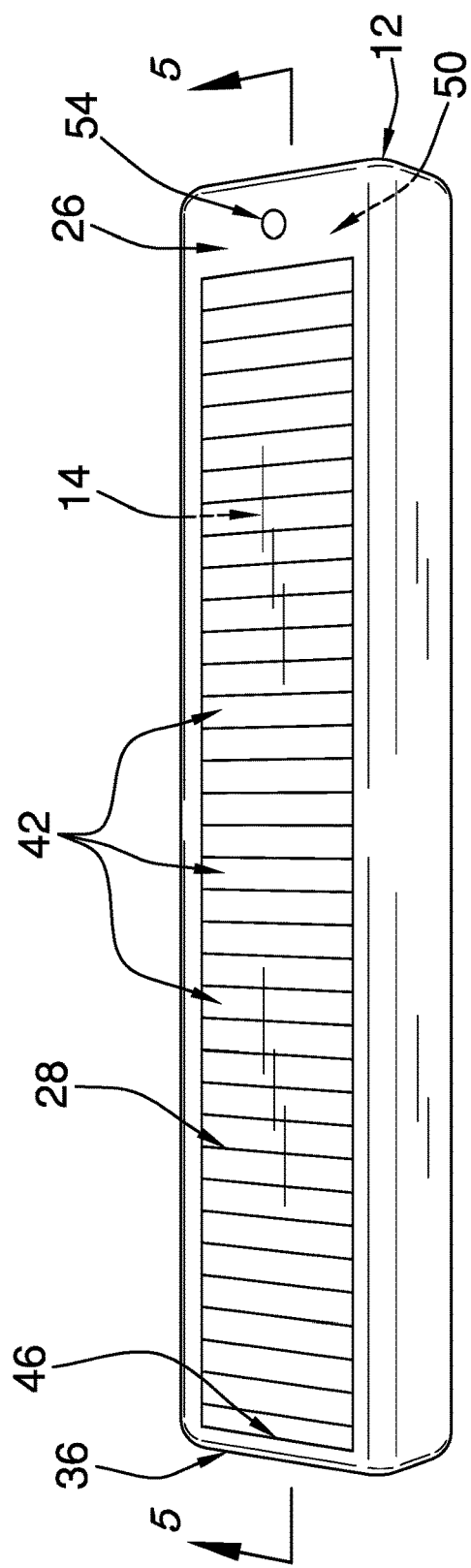
FIG. 4 is an isometric perspective view of an embodiment of the disclosure.
Figure 5:
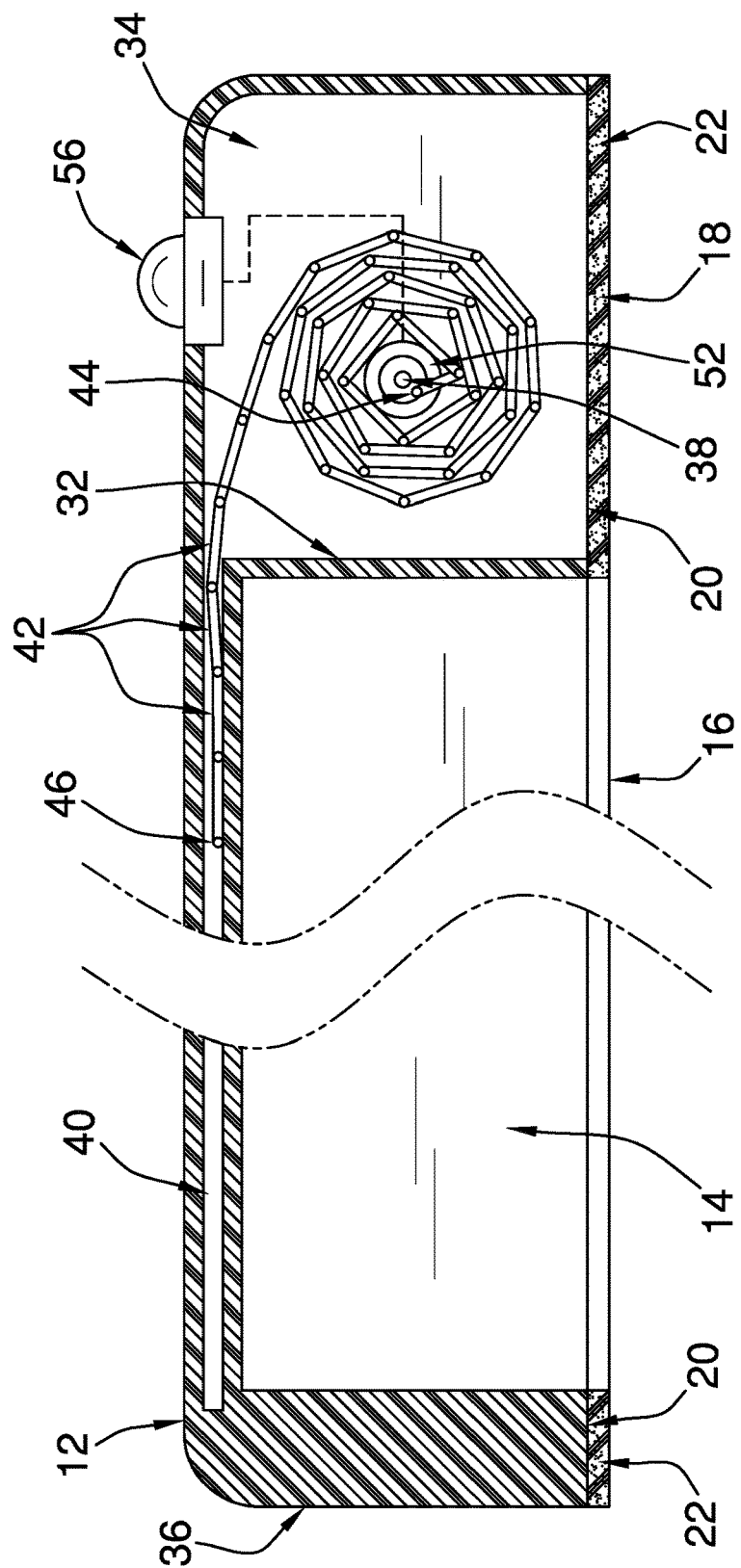
FIG. 5 is a cross-sectional view of an embodiment of the disclosure.
Figure 6:
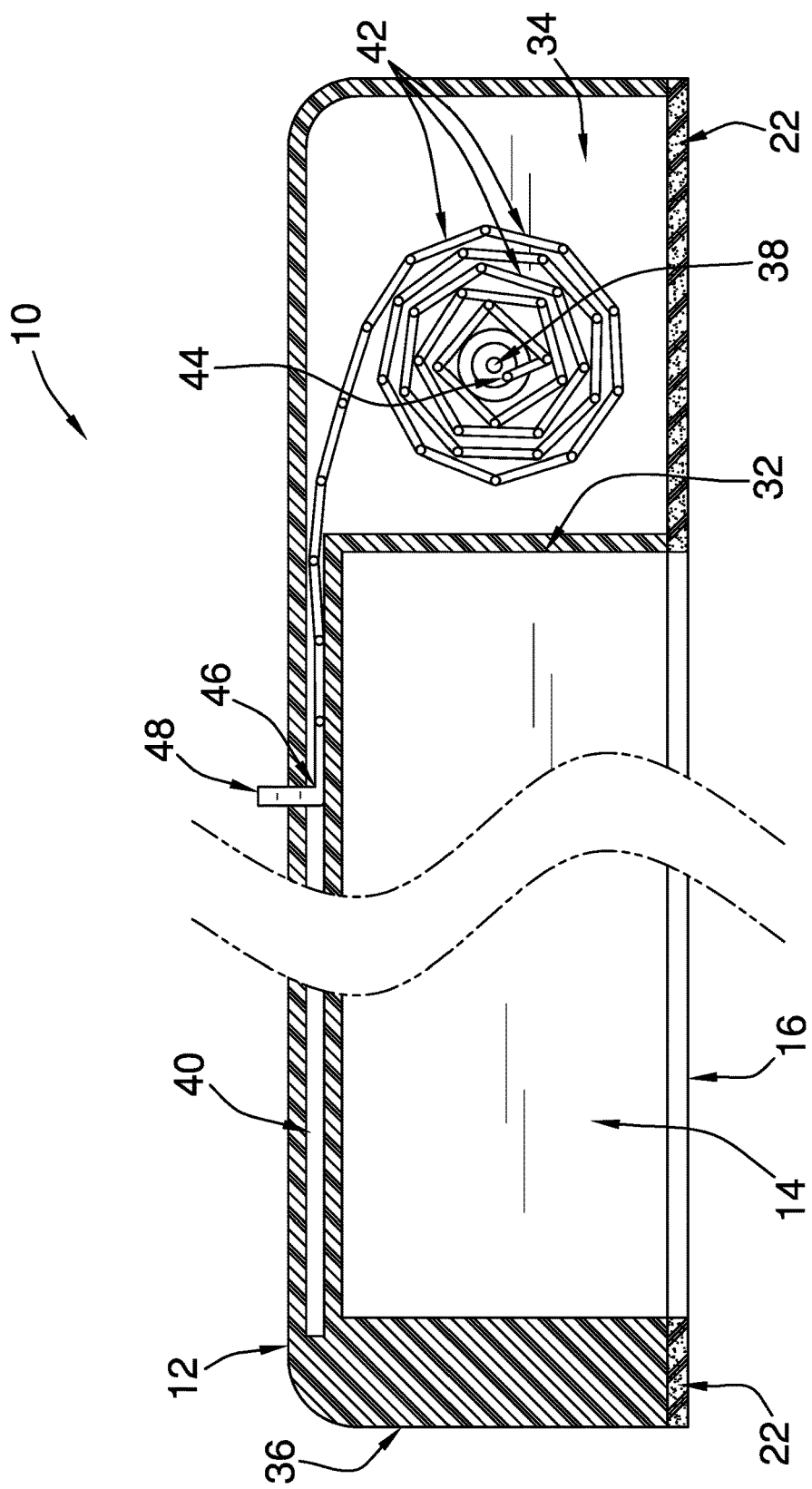
FIG. 6 is a cross-sectional view of an embodiment of the disclosure.
Figure 7:
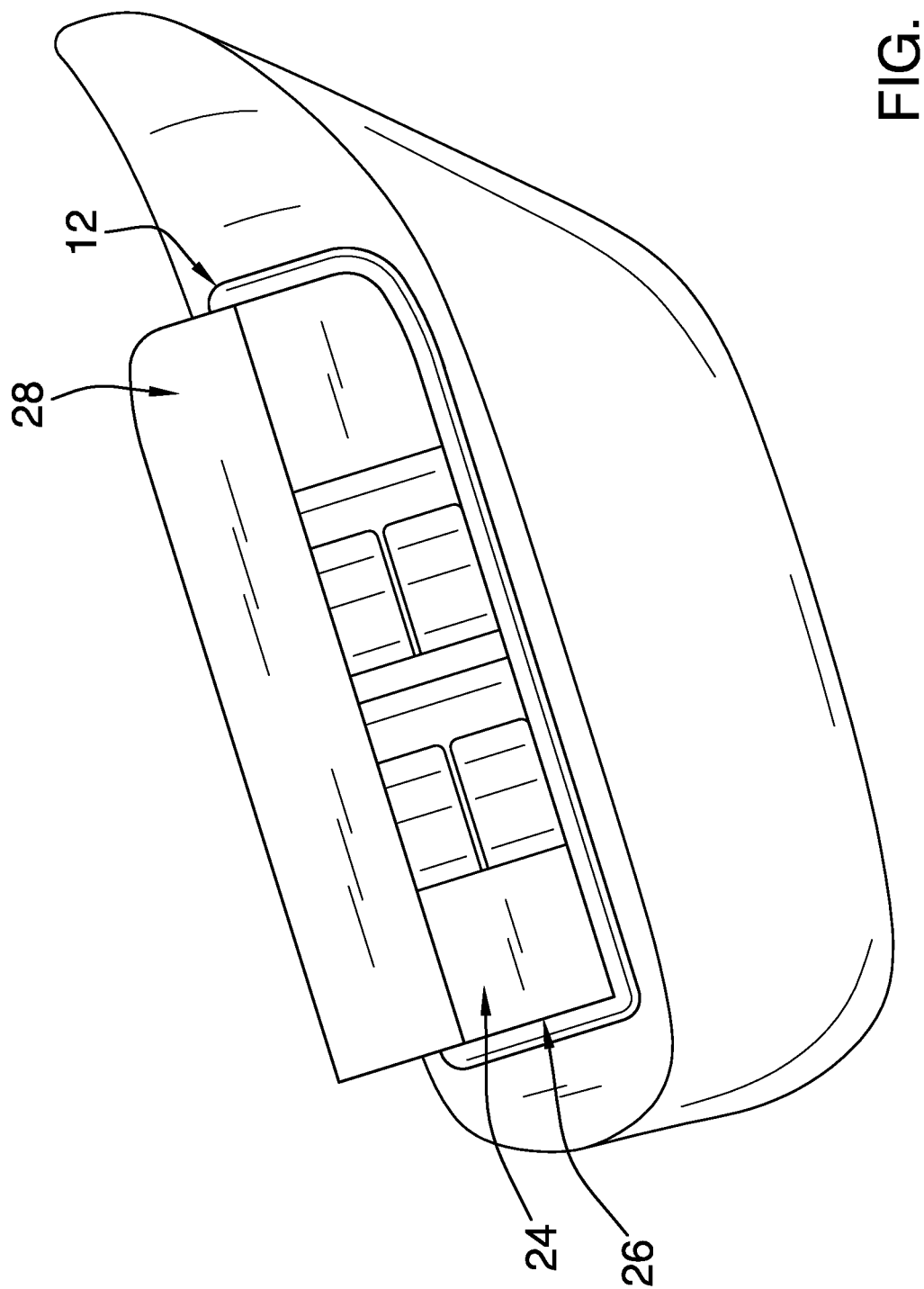
FIG. 7 is an isometric perspective view of an embodiment of the disclosure.
Figure 8:
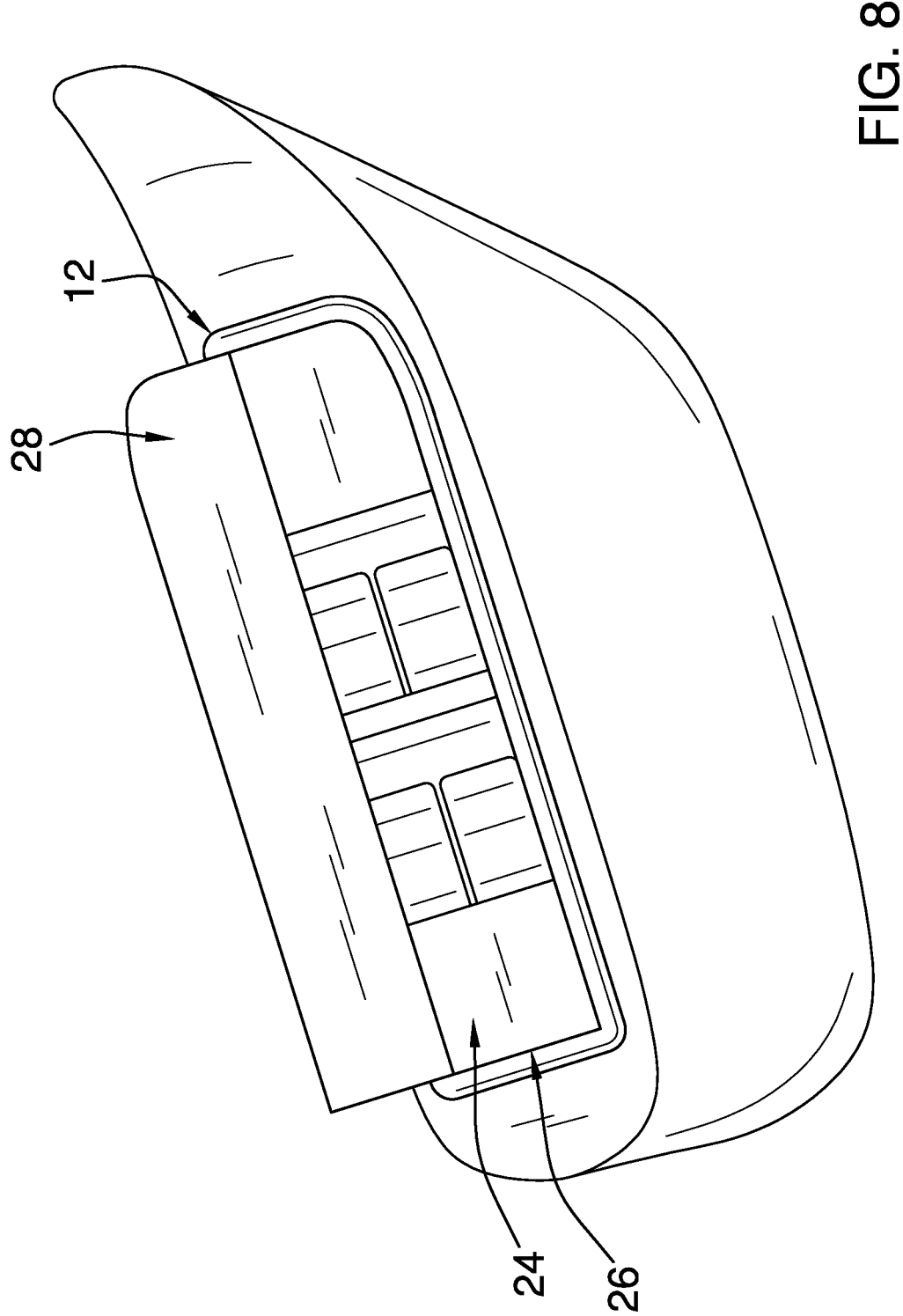
FIG. 8 is an isometric perspective view of an embodiment of the disclosure.
Figure 9:
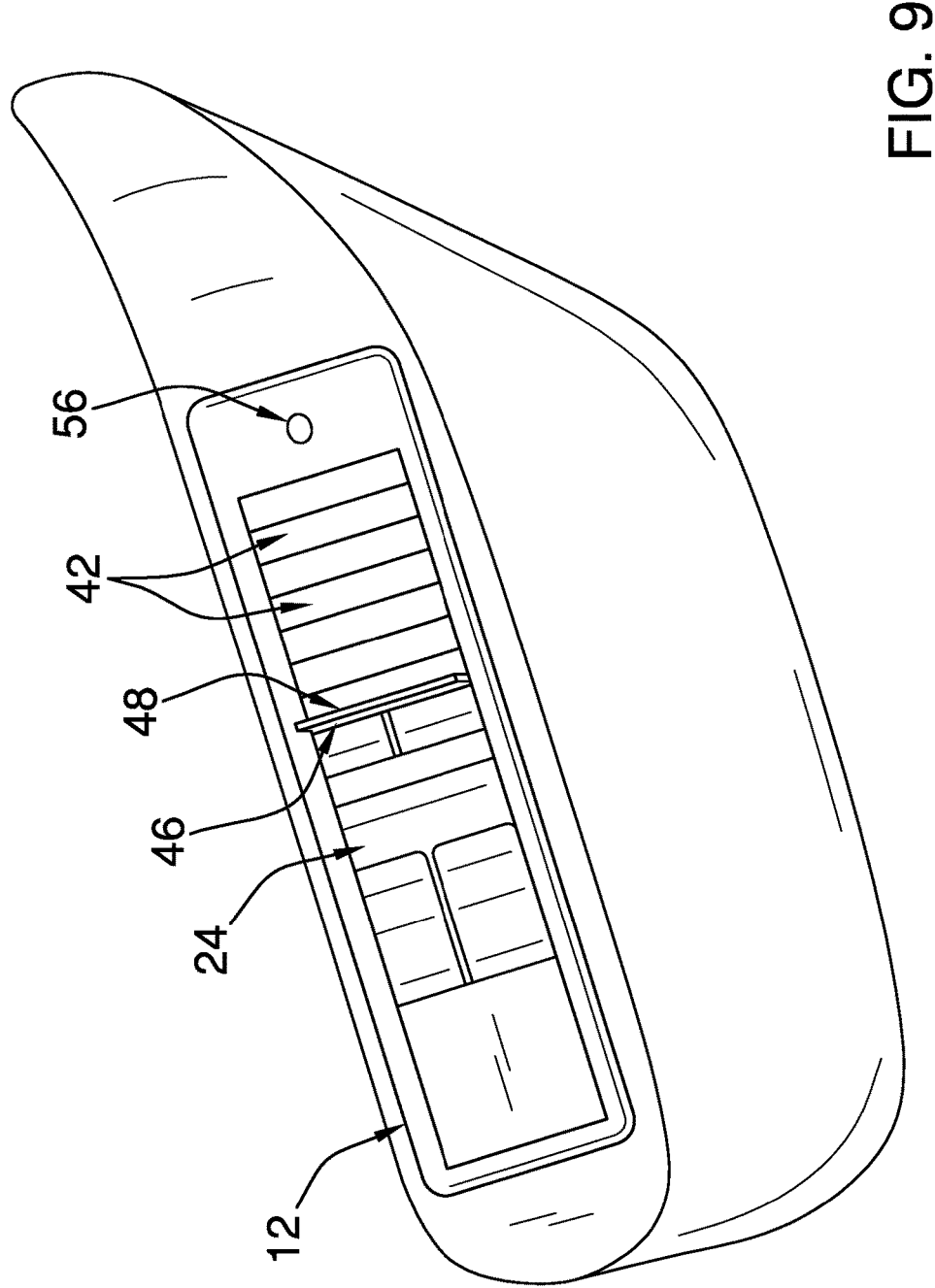
FIG. 9 is an isometric perspective view of an embodiment of the disclosure.

With reference now to the drawings, and in particular to FIGS. 1 through 7C thereof, a new shielding device embodying the principles and concepts of an embodiment of the disclosure and generally designated by the reference numeral 10 will be described.

As best illustrated in FIGS. 1 through 7C, the vehicle attachable shielding device 10 generally comprises a shell 12 that defines an interior space 14. In one embodiment, the shell 12 is elongated rectangularly box shaped. In another embodiment, the shell 12 comprises plastic.

A first penetration 16 is positioned in a bottom 18 of the shell 12 to define a rim 20. The first penetration 16 is configured to insert a control assembly of the vehicle into the interior space 14.

A coupler 22 is coupled to the rim 20. The coupler 22 is configured to couple to an interior surface of a vehicle, such as an armrest that is coupled to a door of the vehicle. In one embodiment, the coupler 22 comprises adhesive.

A second penetration 24 is positioned in a top 26 of the shell 12. The second penetration 24 is configured to insert a hand of a user into the interior space 14 to manipulate the control assembly.

A panel 28 is coupled to the shell 12. The panel 28 is complementary to the penetration. The panel 28 also is selectively couplable to the shell 12. In one embodiment, the panel 28 comprises metal. In another embodiment, the panel 28 comprises metal.

In one embodiment of the invention, the panel 28 is hingedly coupled to the top 26 adjacent to the second penetration 24. The panel 28 is positioned to pivot to couple to the shell 12 to close the second penetration 24 and to substantially seal the control assembly within the interior space 14. The shell 12 and the panel 28 are configured to protect the control assembly from the moisture damage. The panel 28 also is positioned to decouple from the shell 12 and to pivot relative to the top 26 so that the second penetration 24 is configured to insert the hand of the user into the interior space 14 to manipulate the control assembly. In another embodiment, the panel 28 is coupled to the shell 12 proximate to a respective opposing side 30 of the shell 12.

In another embodiment of the invention, a wall 32 is coupled to and extends between the opposing sides 30 of the shell 12 to define a chamber 34. The first penetration 16 extends from a first end 36 of the shell 12 to the wall 32 so that the chamber 34 is solid-bottomed. A cylinder 38 is positioned in the chamber 34. The cylinder 38 is rotationally coupled to and extends between the opposing sides 30 of the shell 12.

In this embodiment, each of a pair of channels 40 is positioned in a respective opposing side 30 of the shell 12 proximate to the top 26. The channels 40 extend from proximate to the first end 36 of the shell 12 through the wall 32. The panel 28 comprises a plurality of sections 42. Each section 42 is pivotally coupled to adjacent sections 42 so that the panel 28 is positioned to roll around the cylinder 38. The panel 28 has a first endpoint 44 that is coupled to the cylinder 38. The panel 28 has a second endpoint 46 that is selectively slidably positionable in the channels 40 between the first end 36 and the wall 32. Respective sections 42 of the panel 28 are positioned to slide through the channels 40 to proximate to the first end 36. The second penetration 24 is closed to substantially seal the control assembly within the interior space 14. The shell 12 and the panel 28 are configured to protect the control assembly from the moisture damage. The panel 28 is positioned to slide through the channels 40 to compel the respective sections 42 to roll around the cylinder 38 so that the second penetration 24 is configured to insert the hand of the user into the interior space 14 to manipulate the control assembly.

In yet another embodiment of the invention, a handle 48 is coupled to the second endpoint 46 of the panel 28. The handle 48 is configured to be pulled by the hand of the user to compel the respective sections 42 of the panel 28 to slide through the channels 40 to proximate to the first end 36. The second penetration 24 is closed to substantially seal the control assembly within the interior space 14. The shell 12 and the panel 28 are configured to protect the control assembly from the moisture damage. The handle 48 also is configured to be pushed by the hand of the user to compel the panel 28 to slide through the channels 40. The respective sections 42 are compelled to roll around the cylinder 38 so that the second penetration 24 is configured to insert the hand of the user into the interior space 14 to manipulate the control assembly.

In still yet another embodiment of the invention, a power module 50 and a motor 52 are coupled to the shell 12 and are positioned in the chamber 34. The motor 52 is operationally coupled to the cylinder 38 and the power module 50.

A controller 54 is coupled to the shell 12. The controller 54 is operationally coupled to the motor 52 and the power module 50. The controller 54 is positioned to selectively couple the motor 52 to the power module 50 so that the motor 52 is compelled to rotate the cylinder 38 in a first direction to compel the respective sections 42 of the panel 28 to slide through the channels 40 to proximate to the first end 36. The second penetration 24 is closed to substantially seal the control assembly within the interior space 14. The shell 12 and the panel 28 are configured to protect the control assembly from the moisture damage. The controller 54 also is positioned to selectively couple the motor 52 to the power module 50 so that the motor 52 is compelled to rotate the cylinder 38 in a second direction to compel the respective sections 42 to roll around the cylinder 38. The second penetration 24 is configured to insert the hand of the user into the interior space 14 to manipulate the control assembly.

In another embodiment, the controller 54 comprises a button 56. The button 56 is depressible. The button 56 is configured to be depressed a first time to couple the motor 52 to the power module 50 so that the motor 52 is compelled to rotate the cylinder 38 in the first direction. The button 56 also is configured to be depressed a second time to couple the motor 52 to the power module 50 so that the motor 52 is compelled to rotate the cylinder 38 in the second direction. In yet another embodiment, the button 56 is lighted.

In use, the first penetration 16 is configured to insert the control assembly of the vehicle into the interior space 14. The coupler 22 is configured to couple to the interior surface of the vehicle, such as the armrest that is coupled to the door of the vehicle. The panel 28 is positioned to couple to the shell 12. The second penetration 24 is closed to substantially seal the control assembly within the interior space 14. The shell 12 and the panel 28 are configured to protect the control assembly from the moisture damage. The panel 28 also is positioned to decouple from the shell 12 so that the second penetration 24 is configured to insert the hand of the user into the interior space 14 to manipulate the control assembly.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle attachable shielding device comprising:
 a shell defining an interior space;
 a first penetration positioned in a bottom of said shell defining a rim;
 a coupler coupled to said rim, said coupler being configured for coupling to an interior surface of a vehicle;
 a second penetration positioned in a top of said shell;
 a panel coupled to said shell, said panel being complementary to said penetration, said panel being selectively couplable to said shell;
 wherein said first penetration is positioned in said bottom such that said first penetration is configured for inserting a control assembly of the vehicle into said interior space, wherein said second penetration is positioned in said top such that said second penetration is configured for inserting a hand of a user into said interior space for manipulating the control assembly, wherein said panel is positioned on said shell such that said panel is positioned for coupling to said shell for closing said second penetration for substantially sealing the control assembly within said interior space such that said shell and said panel are configured for protecting the control assembly from moisture damage, wherein said panel is positioned for decoupling from said shell such that said second penetration is configured for inserting the hand of the user through said second penetration into said interior space for manipulating the control assembly;

a wall coupled to and extending between opposing sides of said shell defining a chamber, said first penetration extending from a first end of said shell to said wall such that said chamber is solid-bottomed;

a cylinder positioned in said chamber, said cylinder being rotationally coupled to and extending between said opposing sides of said shell;

a pair of channels, each said channel being positioned in a respective said opposing side of said shell proximate to said top, said channels extending from proximate to said first end of said shell through said wall;

said panel comprising a plurality of sections, each said section being pivotally coupled to adjacent said sections such that said panel is positioned for rolling around said cylinder, said panel having a first endpoint coupled to said cylinder, said panel having a second endpoint, said second endpoint being selectively slidably positionable in said channels between said first end and said wall; and wherein said panel is positioned on said cylinder such that respective said sections of said panel are positioned for sliding through said channels to proximate to said first end for closing said second penetration for substantially sealing the control assembly within said interior space such that said shell and said panel are configured for protecting the control assembly from the moisture damage, wherein said panel is positioned for sliding through said channels compelling said respective said sections rolling around said cylinder such that said second penetration is configured for inserting the hand of the user into said interior space for manipulating the control assembly.

2. The device of claim 1, further including said shell being elongated rectangularly box shaped.

3. The device of claim 1, further including said shell and said panel comprising plastic.

4. The device of claim 1, further including said panel comprising metal.

5. The device of claim 1, further including said coupler comprising adhesive.

6. The device of claim 1, further including said panel being hingedly coupled to said top adjacent to said second penetration, wherein said panel is positioned on said shell such that said panel is positioned for pivoting and coupling to said shell for closing said second penetration for substantially sealing the control assembly within said interior space such that said shell and said panel are configured for protecting the control assembly from the moisture damage, wherein said panel is positioned for decoupling from said shell and pivoting relative to said top such that said second penetration is configured for inserting the hand of the user into said interior space for manipulating the control assembly.

7. The device of claim 6, further including said panel being coupled to said shell proximate to a respective opposing side of said shell.

8. The device of claim 1, further including a handle coupled to said second endpoint of said panel, wherein said handle is positioned on said panel such that said handle is configured for pulling by the hand of the user for compelling said respective said sections of said panel for sliding through said channels to proximate to said first end for closing said second penetration for substantially sealing the control assembly within said interior space such that said shell and said panel are configured for protecting the control assembly from the moisture damage, wherein said handle is positioned on said panel such that said handle is configured for pushing by the hand of the user for compelling said panel for sliding through said channels for compelling said respective said sections for rolling around said cylinder such that said second penetration is configured for inserting the hand of the user into said interior space for manipulating the control assembly.

9. The device of claim 1, further comprising:
a power module coupled to said shell and positioned in said chamber;
a motor coupled to said shell and positioned in said chamber, said motor being operationally coupled to said cylinder and said power module;
a controller coupled to said shell, said controller being operationally coupled to said motor and said power module, wherein said controller is positioned on said shell such that said controller is positioned for selectively coupling said motor to said power module such that said motor is compelled for rotating said cylinder in a first direction for compelling said respective said sections of said panel for sliding through said channels to proximate to said first end for closing said second penetration for substantially sealing the control assembly within said interior space such that said shell and said panel are configured for protecting the control assembly from the moisture damage, wherein said controller is positioned on said shell such that said controller is positioned for selectively coupling said motor to said power module such that said motor is compelled for rotating said cylinder in a second direction for compelling said respective said sections for rolling around said cylinder such that said second penetration is configured for inserting the hand of the user into said interior space for manipulating the control assembly.

10. The device of claim 9, further including said controller comprising a button, said button being depressible, wherein said button is positioned on said shell such that said button is configured for depressing a first time for coupling said motor to said power module such that said motor is compelled for rotating said cylinder in the first direction for compelling said respective said sections of said panel for sliding through said channels to proximate to said first end for closing said second penetration for substantially sealing the control assembly within said interior space such that said shell and said panel are configured for protecting the control assembly from the moisture damage, wherein said button is positioned on said shell such that said button is configured for depressing a second time for coupling said motor to said power module such that said motor is compelled for rotating said cylinder in the second direction for compelling said respective said sections for rolling around said cylinder such that said second penetration is configured for inserting the hand of the user into said interior space for manipulating the control assembly.

11. The device of claim 10, further including said button being lighted.

12. A vehicle attachable shielding device comprising:
a shell defining an interior space, said shell being elongated rectangularly box shaped, said shell comprising plastic;
a first penetration positioned in a bottom of said shell defining a rim;
a coupler coupled to said rim, said coupler being configured for coupling to an interior surface of a vehicle, said coupler comprising adhesive;
a second penetration positioned in a top of said shell, wherein said second penetration is positioned in said top such that said second penetration is configured for inserting a hand of a user into said interior space for manipulating the control assembly;
a panel coupled to said shell, said panel being complementary to said penetration, said panel being selectively couplable to said shell;
wherein said first penetration is positioned in said bottom such that said first penetration is configured for inserting a control assembly of the vehicle into said interior space, wherein said panel is positioned on said shell such that said panel is positioned for coupling to said shell for closing said second penetration for substantially sealing the control assembly within said interior space such that said shell and said panel are configured for protecting the control assembly from moisture damage, wherein said panel is positioned for decoupling from said shell such that said second penetration is configured for inserting the hand of the user into said interior space for manipulating the control assembly, said panel comprising plastic;
a wall coupled to and extending between opposing sides of said shell defining a chamber, said first penetration extending from a first end of said shell to said wall such that said chamber is solid-bottomed;
a cylinder positioned in said chamber, said cylinder being rotationally coupled to and extending between said opposing sides of said shell;
a pair of channels, each said channel being positioned in a respective said opposing side of said shell proximate to said top, said channels extending from proximate to said first end of said shell through said wall;
said panel comprising a plurality of sections, each said section being pivotally coupled to adjacent said sections such that said panel is positioned for rolling around said cylinder, said panel having a first endpoint coupled to said cylinder, said panel having a second endpoint, said second endpoint being selectively slidably positionable in said channels between said first end and said wall; and
wherein said panel is positioned on said cylinder such that respective said sections of said panel are positioned for sliding through said channels to proximate to said first end for closing said second penetration for substantially sealing the control assembly within said interior space such that said shell and said panel are configured for protecting the control assembly from the moisture damage, wherein said panel is positioned for sliding through said channels compelling said respective said sections rolling around said cylinder such that said second penetration is configured for inserting the hand of the user into said interior space for manipulating the control assembly.

13. The device of claim 12, further including said panel comprising metal.

14. The device of claim 12, further including said panel being hingedly coupled to said top adjacent to said second penetration, wherein said panel is positioned on said shell such that said panel is positioned for pivoting and coupling to said shell for closing said second penetration for substantially sealing the control assembly within said interior space such that said shell and said panel are configured for protecting the control assembly from the moisture damage, wherein said panel is positioned for decoupling from said shell and pivoting relative to said top such that said second penetration is configured for inserting the hand of the user into said interior space for manipulating the control assembly, said panel being coupled to said shell proximate to a respective opposing side of said shell.

15. The device of claim 12, further including a handle coupled to said second endpoint of said panel, wherein said handle is positioned on said panel such that said handle is configured for pulling by the hand of the user for compelling said respective said sections of said panel for sliding through said channels to proximate to said first end for closing said second penetration for substantially sealing the control assembly within said interior space such that said shell and said panel are configured for protecting the control assembly from the moisture damage, wherein said handle is positioned on said panel such that said handle is configured for pushing by the hand of the user for compelling said panel for sliding through said channels for compelling said respective said sections for rolling around said cylinder such that said second penetration is configured for inserting the hand of the user into said interior space for manipulating the control assembly.

16. The device of claim 12, further comprising:
a power module coupled to said shell and positioned in said chamber;
a motor coupled to said shell and positioned in said chamber, said motor being operationally coupled to said cylinder and said power module;
a controller coupled to said shell, said controller being operationally coupled to said motor and said power module, said controller comprising a button, said button being depressible, wherein said button is positioned on said shell such that said button is configured for depressing a first time for coupling said motor to said power module such that said motor is compelled for rotating said cylinder in the first direction for compelling said respective said sections of said panel for sliding through said channels to proximate to said first end for closing said second penetration for substantially sealing the control assembly within said interior space such that said shell and said panel are configured for protecting the control assembly from the moisture damage, wherein said button is positioned on said shell such that said button is configured for depressing a second time for coupling said motor to said power module such that said motor is compelled for rotating said cylinder in the second direction for compelling said respective said sections for rolling around said cylinder such that said second penetration is configured for inserting the hand of the user into said interior space for manipulating the control assembly, said button being lighted.

* * * * *